US006180843B1

(12) United States Patent
Heinemann et al.

(10) Patent No.: US 6,180,843 B1
(45) Date of Patent: Jan. 30, 2001

(54) METHOD FOR PRODUCING GAS HYDRATES UTILIZING A FLUIDIZED BED

(75) Inventors: Robert Frederick Heinemann; David Da-Teh Huang; Jinping Long, all of Plano, TX (US); Roland Bernard Saeger, Runnemede, NJ (US)

(73) Assignee: Mobil Oil Corporation, Fairfax, VA (US)

( * ) Notice: Under 35 U.S.C. 154(b), the term of this patent shall be extended for 0 days.

(21) Appl. No.: 08/950,246

(22) Filed: Oct. 14, 1997

(51) Int. Cl.$^7$ ........................................................ F25J 1/00

(52) U.S. Cl. .......................... 585/15; 62/45.1; 62/48.1; 62/54.3; 62/57; 62/601

(58) Field of Search .................... 585/15; 62/45.1, 62/48.1, 54.3, 57, 601

(56) References Cited

U.S. PATENT DOCUMENTS

| | | |
|---|---|---|
| 2,270,016 | 1/1942 | Benesh . |
| 2,356,407 * | 8/1944 | Hutchinson ............................. 585/15 |
| 2,375,559 | 5/1945 | Hutchinson et al. . |
| 2,375,560 * | 5/1945 | Hutchinson et al. .................. 585/15 |
| 2,904,511 | 9/1959 | Donath . |
| 3,148,143 * | 9/1964 | Donath ................................. 585/15 |
| 3,170,870 | 2/1965 | Bachman . |
| 3,231,630 * | 1/1966 | Glew ..................................... 585/15 |
| 3,514,274 | 5/1970 | Cahn et al. . |
| 3,856,492 | 12/1974 | Klass . |
| 3,888,434 | 6/1975 | Chersky et al. . |
| 3,954,921 | 5/1976 | Yoshida et al. . |
| 3,975,167 | 8/1976 | Nierman . |
| 4,915,176 | 4/1990 | Sugier et al. . |
| 4,920,752 | 5/1990 | Ehrsam . |
| 4,930,319 | 6/1990 | Bee et al. . |
| 5,473,904 | 12/1995 | Guo et al. . |
| 5,536,893 | 7/1996 | Gudmundsson . |
| 5,562,891 | 10/1996 | Spencer et al. . |
| 6,028,234 * | 2/2000 | Heinemann et al. .................. 585/15 |

FOREIGN PATENT DOCUMENTS

WO93/01153   1/1993   (WO) .

OTHER PUBLICATIONS

W.P. Gee, et al., "The Solvent Dewaxing Process," *Refiner & Natural Gasoline Manufacturer*, vol. 15, No. 6 (1936), pp. 205–209.

B. Miller, et al., "Hydrate Storage of Natural Gas," *American Gas Association Monthly*, vol. 28, No. 2 (1946), pp. 63–67, 92.

D. Katz, et al., *Handbook of Natural Gas Engineering*, McGraw–Hill, New York (1959) pp. 189–121.

H.C. Kim, "Kinetics of Methane Hydrate Decomposition," *Chemical Engineering Science*, vol. 42, No. 7 (1987), pp. 1645–1653.

A.A. Trofimuk, et al., "The Dynamics of the Zone of Hydrate Formation and its Effect on the Temperaure Regime of the Dryolithozone," *Soviet Geology and Geophysics*, vol. 27, No. 11 (1987), pp. 1–7.

I. Ridley, et al., "Gas Hydrates Keep Energy on Ice," *New Scientist*, No. 1601 (1988), pp. 53–58.

Y.P. Handa, "A Calorimetric Study of Naturally Occurring Gas Hydrates," *Industrial & Engineering Chemistry Research*, vol. 27, No. 5 (1988), pp. 872–874.

L.F. Smirnov, "New Technologies Using Gas Hydrates," *Theoretical Foundations of Chemical Engineering*, vol. 23, No. 6 (1990), pp. 514–526 (Russian language original published at Teor. Osn. Khim. Tekhnol. V23(6), 808–822 (1989).

E.D. Ershov, et al., "Experimental Investigations of the Microstructure of Agglomerate of Ice and Methane Hydrate," *Soviet Engineering Geology*, vol. 3 (1990), pp. 32–37.

E. D. Sloan, Gas Research Institute, Topical Report "The State–of–the–Art of Hydrates as Related to the Natural Gas Industry," GRI–91/0302, 1992.

E.D. Ershov, et al., Experimental Research on Gas Hydrate Decomposition in Frozen Rocks, *Cold Regions Science and Technology*, vol. 20 (1992), pp. 147–156.

P. Englezos, "Clathrate Hydrates," *Industrial & Engineering Chemical Research*, vol. 32 (1993), pp. 1251–1274.

J.S. Gudmundsson, "Storing Natural Gas as Frozen Hydrate," *SPE Production & Facilities*, vol. 9, No. 1 (1994), pp. 69–73.

R.D. Malone, "Gas Hydrate Geology and Geography," International Conference on Natural Gas Hydrates, *Annals of the New York Academy of Sciences*, vol. 715, pp. 225–231.

K.A. Kvenvolden, "Natural Gas Hydrate Occurrence and Issues," International Conference on Natural Gas Hydrates, *Annals of the New York Academy of Sciences*, vol. 715, pp. 232–246.

(List continued on next page.)

*Primary Examiner*—Walter D. Griffin (57) ABSTRACT

An apparatus for producing gas hydrates includes a reactor vessel having a fluidized or expanded bed reaction zone. The reactor vessel has an upper portion and a lower portion, wherein a cross-sectional area of the upper portion is larger than a cross-sectional area of the lower portion. Water is introduced into the reactor vessel, and hydrate-forming gas is introduced, under an elevated pressure, into the lower portion of the reactor vessel. Preferably, the water and gas flow in a countercurrent manner through the reactor and into the fluidized or expanded bed reaction zone. The apparatus can include a mechanism for withdrawing unreacted hydrate-forming gas from the upper portion of the reactor vessel and recycling it back into the fluidized or expanded reaction bed. A defrosting device can be included with the reactor so that at least a portion of at least one wall of the reactor vessel can be defrosted. The invention further relates to methods for using a fluidized or expanded bed reactor to produce gas hydrates.

14 Claims, 3 Drawing Sheets

OTHER PUBLICATIONS

J.S. Gudmundsson, et al., "Transport of Natural Gas as Frozen Hydrate," *Proceedings of the Fifth International Offshore and Polar Engineering Conference*, vol. 1, The Hague, Netherlands, Jun. 1995, pp. 282–288.

"Natural Gas Transport as Hydrates 25% Below Cost of LNG," *Offshore*, Nov., 1995, p. 26.

J. Long, "Gas Hydrate Formation Mechanism and Kinetic Inhibition," Ph.D. Dissertation, 1994, Colorado School of Mines, Golden, Colorado.

MS Peters et al., "Plant Design and Economics for Chemical Engineers", McGraw Hill, 1976, pp. 575–586.

* cited by examiner

METHOD FOR PRODUCING GAS HYDRATES UTILIZING A FLUIDIZED BED

FIELD OF THE INVENTION

This invention relates to an apparatus and method for continuous production of gas hydrates. The invention includes the use of a fluidized or expanded bed reactor for contacting the gas and water reactants to produce gas hydrates.

BACKGROUND OF THE INVENTION

Gas hydrates have been known for many years. These hydrates are inclusion compounds wherein various light hydrocarbon gases or other gases, such as natural gas, methane, ethane, propane, butane, carbon dioxide, hydrogen sulfide, nitrogen, and combinations thereof, physically react with water at elevated pressures and low temperatures. The gas becomes included or entrapped within the extended solid water lattice network which includes hydrogen bonded water molecules. The hydrate structure is stable due to weak van der Waals' forces between the gas and water molecules and hydrogen bonding between water molecules within the lattice structure.

At least two different hydrate crystal structures are known, each of which is a clathrate crystalline structure. A clathrate hydrate unit crystal of structure I includes two tetrakaidecahedron cavities and six dodecahedron cavities for every 46 water molecules. A clathrate hydrate unit crystal of structure II contains eight large hexakaidecahedron cavities and 16 dodecahedron cavities for every 136 water molecules. A relatively large volume of gas can be entrapped under pressure in these cavities. For example, it has been determined that natural gas hydrates can contain as much as 180 standard cubic feet of gas per cubic foot of the solid natural gas hydrates.

Early on, gas hydrates were considered an industrial nuisance. Petroleum and natural gas production facilities are often located in cold environments, where the product is located in deep underground or underwater wells. When tapping these wells, all of the necessary ingredients and conditions are present for producing gas hydrates—i.e., light hydrocarbon gases and water are present, the temperature is low, and the pressure is high. Therefore, gas hydrates were often produced spontaneously in the drilling and transmission pipes during oil or natural gas production. Because gas hydrates are solid materials that do not readily flow in concentrated slurries or in solid form, when spontaneously produced during oil or natural gas production, the hydrates tend to clog the pipes, channels, and equipment in the production and transmission systems. These disadvantageous properties of gas hydrates spawned much research into methods for inhibiting hydrate formation and eliminating this nuisance. See, for example, D. Katz, et al., *Handbook of Natural Gas*, McGraw-Hill, New York (1959) pp. 189–221; E. D. Sloan, Jr., *Clathrate Hydrates of Natural Gases*, Marcel Dekker, Inc. (1991). These documents are entirely incorporated herein by reference.

But, because of the relatively high volume of gas that potentially can be stored in gas hydrates, eventually researchers began to look at this "nuisance" as a possible method for storing and/or transporting gases. See B. Miller, et al., *Am. Gas. Assoc. Mon.* Vol. 28, No. 2 (1946), pg. 63. This document is entirely incorporated herein by reference. U.S. Pat. No. 3,514,274 to Cahn, et al., also entirely incorporated herein by reference, describes a process in which a solid hydrate phase is generated in one or more process steps. The hydrate then is conveyed to storage or a marine transport vessel. This process is disadvantageous, however, because it requires conveyance of a concentrated hydrate slurry in a liquid propane carrier.

Hutchinson, et al., U.S. Pat. No. 2,375,559 (which patent is entirely incorporated herein by reference), describe a process for hydrating hydrocarbon gases. In this process, the gas and water components are mixed in a pipe that moves the hydrate product to storage tanks. Because of the poor flowing properties of gas hydrates, as noted above, this device would be subject to clogging.

U.S. Pat. No. 2,904,511 to Donath illustrates a water desalination apparatus that produces desalinated water from salt water by forming gas hydrates. The hydrate forming vessel of Donath is partially filled with water to be purified, and the hydrate-forming gas is introduced into the liquid water to form the hydrate. Because of the presence of the liquid water in the hydrate forming vessel, this apparatus would not be well suited for use on board a ship or oil platform or other areas influenced by waves. This Donath patent is entirely incorporated herein by reference.

Figure 1:
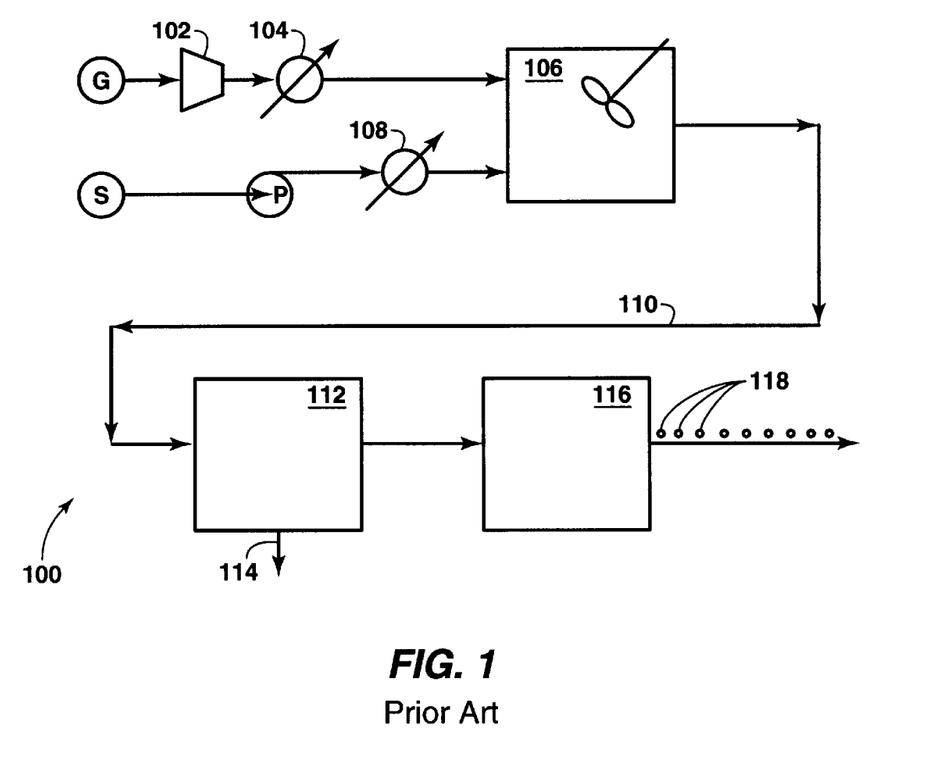
FIG. 1, as described above, is a schematic diagram illustrating a known process for producing gas hydrates using a continuously stirred tank reactor.

Gudmundsson describes various systems for making gas hydrates. See, for example, U.S. Pat. No. 5,536,893; WO Patent Publication No. 93/01153; "Transport of Natural Gas as Frozen Hydrate," ISOPE Conference Proceedings, V1, The Hague, Netherlands, June 1995; and "Storing Natural Gas as Frozen Hydrate," SPE Production & Facilities, February 1994. These documents each are entirely incorporated herein by reference. A typical system 100 of Gudmundsson is generally shown in FIG. 1. In this system, natural gas from a gas source G is compressed (102), cooled (104), and fed to a continuously stirred tank reactor vessel 106. Water from a suitable source S is pumped (pump "P") through a cooler 108 to form a water/ice slurry that is introduced into the tank 106. The tank 106 is maintained under conditions appropriate to produce a gas hydrate (e.g., 50° F., 720 psig). The gas hydrate slurry produced in the tank 106 is transported via line 110 to a separator 112 where water is removed via line 114. The separator 112 includes a series of cyclones and a rotary-drum filter. Finally, the purified hydrates are frozen to 5° F. in a freezer 116, from where the hydrates 118 are transferred to storage or a transport device.

SUMMARY OF THE INVENTION

It is an object of this invention to overcome various disadvantages and problems with known gas hydrate production methods. As objectives, this invention seeks to provide a method and apparatus for producing gas hydrates continuously, simply, efficiently, and cleanly, using a minimal amount of equipment.

In a first aspect, this invention relates to an apparatus for producing gas hydrates. The apparatus includes a reactor vessel which has a fluidized or expanded bed reaction zone. The reactor vessel has an upper portion and a lower portion, wherein a cross-sectional area of the upper portion of the reactor vessel is larger than a cross-sectional area of the lower portion. A means is provided for introducing water into the reactor vessel, preferably into the upper portion of the vessel. Also, a means is provided for introducing a hydrate-forming gas under an elevated pressure into the lower portion of the reactor vessel. Preferably, the means for introducing water and the means for introducing hydrate-forming gas are arranged such that the gas and water flow in a countercurrent manner to the fluidized or expanded bed.

Hydrate production can be controlled in the apparatus of the invention by adjusting the relative diameters of the upper and lower portions of the reactor vessel. As noted above, the cross-sectional area of the upper portion is larger than the cross-sectional area of the lower portion. Therefore, typically, the diameter $D_1$ of the upper portion of the reactor vessel will be greater than $D_2$, the diameter of the lower portion of the vessel. Preferably $D_1/D_2$ is greater than about 1 and about 8 or less, advantageously, $D_1/D_2$ is about 1.2 or greater and about 6 or less, and even more preferably, $D_1/D_2$ is about 2 or greater and about 5 or less.

Additionally, the relative heights of the upper and lower portions can be adjusted to control gas hydrate production. Assuming that the upper and lower portions each independently maintain an essentially constant diameter ($D_1$ for the upper portion and $D_2$ for the lower portion), it is preferred that the ratio of the height of the upper portion ($H_1$) to the height of the lower portion ($H_2$) remains less than about 10, and even more preferably, this ratio is less than about 5. Typically, this ratio can be as low as about 2. Without departing from the invention, the lower portion can have a greater height than the upper portion (i.e., $H_2$ is greater than $H_1$, or $H_1/H_2$ is less than 1).

The apparatus according to the invention can further include a means for withdrawing unreacted hydrate-forming gas from the upper portion of the reactor vessel. The withdrawn gas optionally can be cooled and recycled back into the reactor vessel. When such recycling is desired, a means for introducing recycled hydrate-forming gas under an elevated pressure is provided to introduce the recycled gas into the lower portion of the reactor vessel.

After the gas hydrates are removed from the reactor vessel, they can be transported to any desired location, e.g., to storage; to a truck, ship, railcar, or other vehicle; or to a location for immediate degassification and use. The transporting means for moving the gas hydrate particles away from the reactor vessel can be any suitable solid moving device, such as a screw conveyor, a belt conveyor, a vehicle, etc.

In one preferred embodiment of the invention, in order to prevent hydrate particles from sticking to the reactor wall(s) and fouling the reactor, the apparatus includes a means for defrosting at least a portion of at least one wall of the reactor vessel. Preferably, essentially the entire interior surface of the reactor vessel can be defrosted by the means for defrosting the walls. The means for defrosting can include any suitable heating means, such as electrical or other heating elements for heating and defrosting the reactor walls, or pipes for moving heated gas or liquids along or within the walls to heat and defrost the walls. The means for defrosting can be an integral part of the reactor vessel construction, or it can be located immediately adjacent to but separate from the walls of the reactor vessel.

The apparatus according to the invention also can be oriented such that its longitudinal axis is vertical or substantially vertical. By "substantially vertical" in this application, Applicants mean that the reactor vessel longitudinal axis is within 2 degrees of vertical. Alternatively, the longitudinal axis of the reactor vessel can be inclined without departing from the invention. When inclined, it is preferred that the longitudinal axis of the reactor vessel is angled within about 0 to about 5 degrees from the vertical direction.

In another aspect, the invention relates to a method for producing gas hydrates using a fluidized or expanded bed reactor. According to the method of the invention, a hydrate-forming gas is introduced into a fluidized or expanded reaction bed. This hydrate-forming gas provides at least a portion of the gas flow necessary to produce or maintain the fluidized or expanded reaction bed. Water also is introduced into the fluidized or expanded reaction bed, preferably in a manner so that it flows countercurrent to the gas flow direction in the fluidized or expanded bed. The hydrate-forming gas and the water react to form gas hydrate particles. At least a portion of the gas hydrate particles so formed provide a solid material for the fluidized or expanded reaction bed of the reactor. Although some of the gas hydrate particles remain in the fluidized or expanded reaction bed, at least a portion of the gas hydrate particles are removed from the fluidized or expanded reaction bed and exit the bed as the gas hydrate product.

As mentioned above, at least a portion of the hydrate-forming gas that is unreacted can be removed from the fluidized or expanded reaction bed and recycled. This recycle makes the reaction process more efficient and reduces waste of the hydrate-forming gas.

Also, the method according to the invention can include defrosting at least a portion of a wall of the reactor vessel. Defrosting, which can be accomplished by any of the methods described above, reduces reactor fouling and increases hydrate production.

BRIEF DESCRIPTION OF THE DRAWINGS

The advantageous aspects of the invention will be more fully understood and appreciated when considered in conjunction with the following detailed description and the attached figures, wherein.

DETAILED DESCRIPTION OF THE INVENTION

The invention relates to a method and apparatus for producing gas hydrates from a hydrate-forming gas and water. While any suitable hydrate-forming gas can be used in the method and apparatus according to the invention, such as natural gas, associated natural gas, methane, ethane, propane, butane, carbon dioxide, nitrogen, and hydrogen sulfide, as well as combinations of these gases, natural gas is particularly suited for use in this invention. Additionally, any suitable water source can be used in the process of the invention, including fresh water, salt water, sea water, process water, etc.

Conveniently, the apparatus according to the invention can be structured such that the gas hydrates are produced in a single reactor vessel, thereby minimizing equipment size and cost. Thus, the method and apparatus according to the invention are particularly well suited for use in locations where gas pipelines or equipment for gas liquidification are unavailable or where the economics of the situation dictate that pipelines or gas liquidification are not feasible. For these reasons, the method and apparatus according to the invention are well suited for use at remote locations, offshore locations, or locations where space is at a premium. Advantageously, the invention can be used on board a ship or an oil platform where remote or offshore gas accumulations, including associated gas in oil production, are located.

The method and apparatus according to the invention provide many distinct advantages over known methods for producing gas hydrates. For example, when using the method and apparatus according to the invention, the gas hydrate product, produced by an inclusion reaction between the hydrate-forming gas and the water, is produced at a higher efficiency and with a higher capacity per unit of reactor volume. While Applicants do not wish to be bound to any particular theory of operation, this improved efficiency and capacity is believed to be, at least in part, the result of the use of a fluidized or expanded reaction bed in the invention. The use of a fluidized or expanded reaction bed produces turbulent gas and water flow because these reactants collide with the solid gas hydrate particles of the fluidized or expanded reaction bed that remain suspended in the gas flow. The suspended gas hydrate particles provide surface area for gas and water contact and increase the gas and water residence time. The turbulent flow as well as the suspended gas hydrate particles provide longer gas and water contact times. These features of the fluidized or expanded reaction bed are believed to result in improved reaction yield and efficiency.

Other features of the invention help provide advantages over known methods for producing gas hydrates. For example, the use of a recycle loop for the unreacted hydrate-forming gas improves efficiency and use of the valuable hydrate-forming gas reactant. Additionally, moving the gas through the fluidized or expanded bed helps remove heat of hydration liberated during the hydration formation reaction, thereby assisting in cooling the reactor and maintaining it under appropriate conditions for hydrate production.

The method and apparatus according to the invention also appears to be more technically sound than other known methods. As described above, considerable fouling of the reactor can occur when using a continuously stirred tank reactor. Because the method and apparatus in accordance with the invention uses a fluidized bed to contact the gas and water reactants, little or no additional equipment is present within the chamber of the reaction vessel. Therefore, there is little or no equipment within the reactor that undesirably collects gas hydrate particles. Furthermore, in the method and apparatus of the invention, a defrosting means is provided to keep the walls of the reactor from collecting gas hydrate particles. This defrosting means keeps the reactor walls free of fouling and also improves the efficiency of the system.

Figure 2:
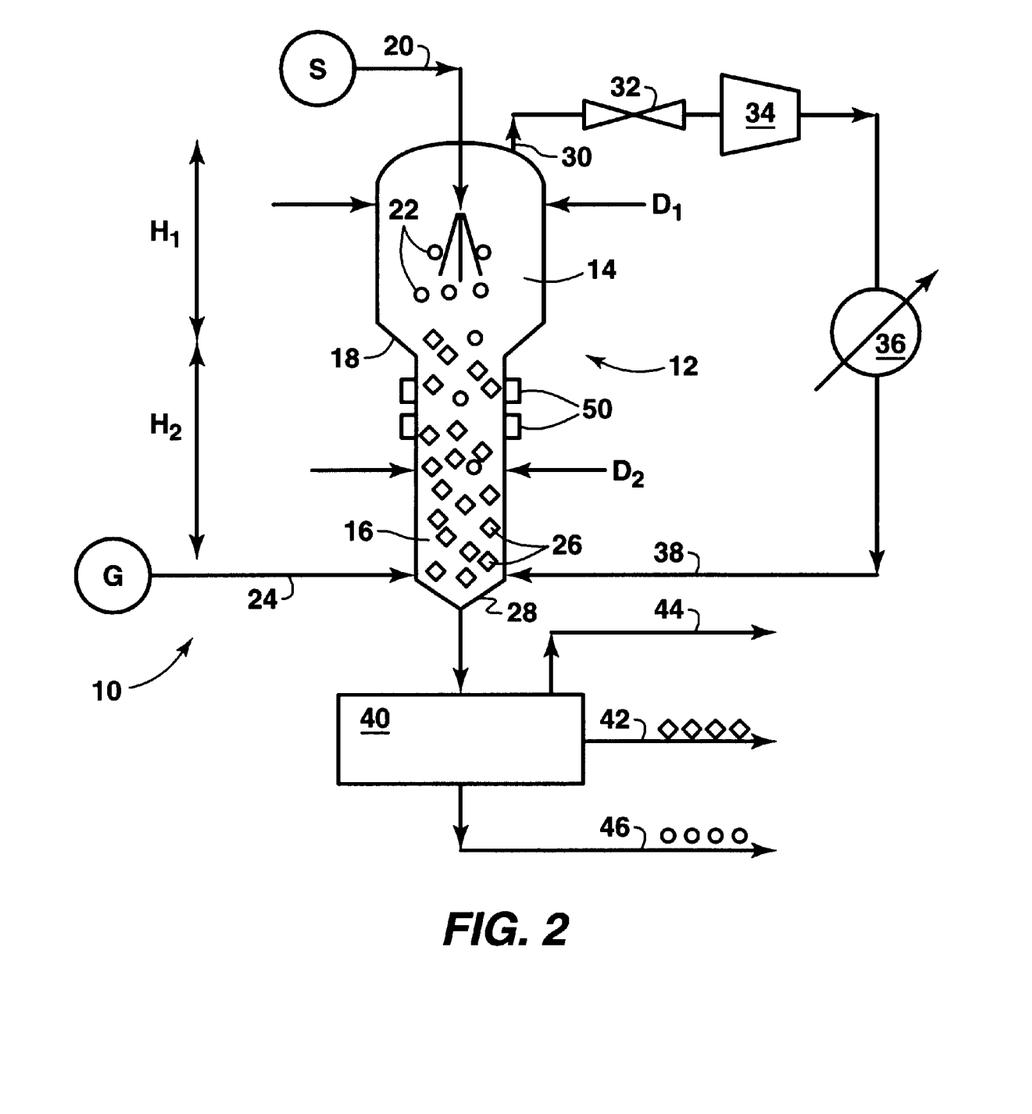
FIG. 2 is a simplified schematic diagram illustrating one embodiment of the apparatus and method according to the invention.

One embodiment of the invention is the gas-continuous apparatus 10 illustrated schematically in FIG. 2. A fluidized or expanded bed reactor vessel 12 is provided with an upper portion 14 and a lower portion 16. This reactor vessel 12 is well insulated to reduce heat transfer from the surrounding environment and to help control the temperature within the reactor vessel 12. A tapered portion 18 connects the upper portion 14 to the lower portion 16. The upper portion 14 has a larger cross-sectional area than that of the lower portion 16, and, as illustrated in FIG. 2, the diameter $D_1$ of the upper portion 14 is larger than the diameter $D_2$ of the lower portion 16. Although the reactor 12 could be of any suitable shape, generally, it is preferred that reactor portions 14 and 16 have round cross-sections so that the reactor 12 appears to be two cylinders stacked one atop the other. Of course, the cross-section can be oval, elliptical, square, rectangular, irregularly-shaped, or any other cross-sectional shape without departing from the invention.

The relative diameters of the upper portion 14 and the lower portion 16 of the reactor 12 can be adjusted to maximize hydrate production efficiency and yield. As noted above, $D_1/D_2$ will typically be greater than about 1 and about 8 or less. In most embodiments of the invention, $D_1/D_2$ will be less than about 5.

The upper portion 14 of the reactor 12 has a longitudinal height $H_1$, and the lower portion 16 has a height $H_2$. These heights can vary widely, depending on the particular operating characteristics of the gas hydrate production system. Generally, it is preferred that the ratio of $H_1/H_2$ be about 10 or less. In fact, in some situations, it may be preferred that $H_2$ be greater than $H_1$ such that the lower portion 16 of the reactor 12 is longer than the upper portion 14.

Typically, the reactor 12 is mounted or arranged so that its longitudinal axis is vertical or substantially vertical with respect to ground. In another embodiment of the invention, however, this longitudinal axis can be oriented in an inclined manner with respect to vertical. Those skilled in the art will be capable of ascertaining an appropriate reactor orientation for optimal use under a given set of conditions through routine experimentation.

Water is introduced into the reactor 12 via water line 20. This water can come from any suitable water supply source S, such as a lake, an ocean, an industrial process, or another fresh or salt water source. If necessary, the water should be cooled so that it is injected into the reactor 12 at a temperature appropriate for gas hydrate formation under the elevated pressure present in the reactor 12. In the embodiment of the invention illustrated in FIG. 2, the water is introduced into the top of the upper portion 14 of the reactor 12, generally along the longitudinal axis of the reactor 12. Other appropriate arrangements for introducing the water can be used without departing from the invention. For example, water could be introduced through the sides of the reactor 12, at virtually any location. Additionally, the water can be introduced into the reactor 12 through more than one introduction port.

For efficient production of gas hydrates, the water should be finely divided either before or after it enters the reactor 12, or as it enters the reactor 12. This can be accomplished, for example, by introducing the water into the reactor 12 through an atomizer or another type of spray nozzle. Also, if desired, the water can be divided after it enters the reactor 12, for example, by using a sparger or other distributor. Finely divided water particles are illustrated in FIG. 2 by small circles (see reference number 22). Desirably, the water droplets are less than about 5000 $\mu$m in diameter, and more preferably, less than about 1000 $\mu$m.

The injected water travels downward along the longitudinal direction of the reactor 12. As it travels down the reactor 12, it meets the hydrate-forming gas. Fresh make-up gas, from any suitable source G, is injected under pressure into the lower portion 16 of the reactor 12 through fresh gas line 24. One skilled in the art will understand, of course, that more than one gas introduction port can be included for injecting fresh gas into the reactor without departing from the invention. For example, multiple gas injection ports at the same or various different heights can be used without departing from the invention. Additionally, a gas injection port can be provided through the bottom of the reactor vessel 12, for injecting gas vertically upward.

The gas is injected under pressure so that it flows upward in the reactor vessel 12 and meets the downward water flow. When the gas and water meet under appropriate temperature and pressure conditions, gas hydrate particles 26 are formed (illustrated as small diamonds in FIG. 2). Suitable temperature and pressure conditions for production of gas hydrates are well documented and known to those skilled in the art.

As examples, the reactor 12 can be maintained at a pressure in the range of about 700 to about 2000 psig and a temperature in the range of about 30 to about 56° F. In the embodiment of the invention illustrated in FIG. 2, the water and gas are in a countercurrent flow arrangement, although a co-current water/gas flow embodiment or other water/gas flow arrangements are possible without departing from the invention.

Typically, if the water droplets 22 are very fine, the initially produced gas hydrate particles 26 also will be very fine. Because of the force and pressure from the upward flowing gas in the reactor 12, many small gas hydrate particles 26 will not fall under the force of gravity to the bottom of the reactor 12. Rather, the gas flow will keep a certain amount of these gas hydrate particles 26 afloat or suspended, thereby producing the fluidized or expanded bed reaction zone. In the embodiment of the invention illustrated in FIG. 2, this fluidized or expanded bed reaction zone exists primarily in the lower portion 16 of the reactor 12. The fluidized or expanded bed may exist completely or partially within the lower portion 16 of the reactor 12. Typically, as the cross-sectional area of the reactor gets larger (e.g., in upper portion 14), higher gas pressures and gas flow volumes are needed to maintain a fluidized or expanded reactor bed.

It is not necessary that the entire lower portion 16 of the reactor 12 include the fluidized bed. Rather, some part of the lower portion 16 of the reactor 12, particularly that below the gas injection ports, can serve, for example, as a volume in which the gas hydrate product is collected before it is withdrawn from the reactor 12.

The use of a fluidized or expanded reaction bed of particles is advantageous for many reasons. First of all, the bed of particles disrupts the gas flow through the reactor and makes it turbulent. Additionally, the bed of particles disrupts the water flow through the reactor, and some water will hit the gas hydrate particles and some will temporarily deposit on the gas hydrate particles. The slowed gas and water flows increase the residence time of the gas and water in the fluidized bed reaction zone and increases the likelihood of contact between these reactants. Additionally, the gas hydrate particles in the bed provide surface area to facilitate reaction between the gas and water. These factors, it is believed, serve to increase the efficiency and reaction yield of the fluidized or expanded bed reactor apparatus and process in accordance with the invention.

Some gas hydrate particles will not be kept afloat by the upward rising gas for various reasons and will fall to the bottom 28 of the reactor 12. In some instances, the suspended gas hydrate particles will grow in the fluidized or expanded bed as more hydrates are produced on their surface. Eventually, these particles will become large enough that they will overcome the force of the upward rising pressurized gas and will fall to the bottom 28 of the reactor 12. Possible gas hydrate withdrawal devices and methods are described in more detail later in this specification.

Not all of the hydrate-forming gas introduced into the reactor 12 reacts with water as it passes through the reactor 12. Excess, unreacted gas is removed from the upper portion 14 of the reactor 12 through one or more gas outlet lines 30. Conveniently, this excess gas carries with it at least a portion of the heat of hydration enthalpy liberated during the hydrate formation reaction processes. Therefore, by removing the excess gas, the reactor 12 can be maintained in a cooled condition. Advantageously, the heat removed from the reactor 12 by removing the excess gas can be sufficient so that little or no auxiliary cooling of the reactor vessel 12 is needed to perform the process of the invention, depending on the ambient conditions. In other words, the excess gas can serve as the main heat removal mechanism for this system and help maintain the apparatus at the desired temperature for hydrate production (e.g., 30 to 56° F.).

Excess gas removed through outlet line 30 also forms the material for a gas recycle loop. Recycling the excess gas is advantageous because it increases the overall efficiency and yield of the apparatus according to the invention. First, the removed gas from line 30 is expanded in expansion device 32. The gas is then passed through a compressor 34 to elevate its pressure to a suitable level for re-introduction into the reactor vessel 12. The gas is then cooled in cooler or other heat exchanger device 36 so that its temperature is suitable for re-introduction into the reactor 12. The cooled gas is then returned to the reactor 12 through recycle line 38 and into the lower portion 16 of the reactor 12 through one or more injection ports.

The gas hydrate particles produced in the reactor 12 are withdrawn therefrom using a suitable product withdrawal device 40. This product withdrawal device 40 can be separate from or integral with the reactor 12, and it also can serve to separate the hydrate product from excess water, excess gas, and/or water and gas resulting from decomposition or regassification of some hydrates. The product withdrawal device 40 can operate continuously or periodically. From the product withdrawal device 40, hydrate product leaves through line 42, any gas present exits for recycle or purge through line 44, and excess water or brine exits through line 46. The water or brine can also be recycled, if desired.

To prevent build-up of gas hydrate particles on the interior walls of the reactor vessel 12, a defrosting means 50 can be included with the apparatus of the invention. Any suitable means for applying heat to the reactor vessel walls can be used as the defrosting means 50. For example, the defrosting means 50 can be electric heating elements applied to or integral with the walls of the reactor vessel 12. As another alternative, the walls of the reactor vessel 12 can include channels through which heated gas or liquid can be charged, or pipes for carrying heated gas or liquid can be located in a heat exchange relationship with the reactor vessel 12 walls. Heat can be applied periodically or continuously through the defrosting means 50, as the conditions dictate. Although only specifically illustrated on the lower portion 16 of the reactor 12 in FIG. 2, the defrosting means 50 also can be arranged to maintain the upper portion 14 of the reactor in a frost-free, hydrate-free condition. The entire reactor 12 can include an appropriate defrosting mechanism, if desired.

Figure 3:
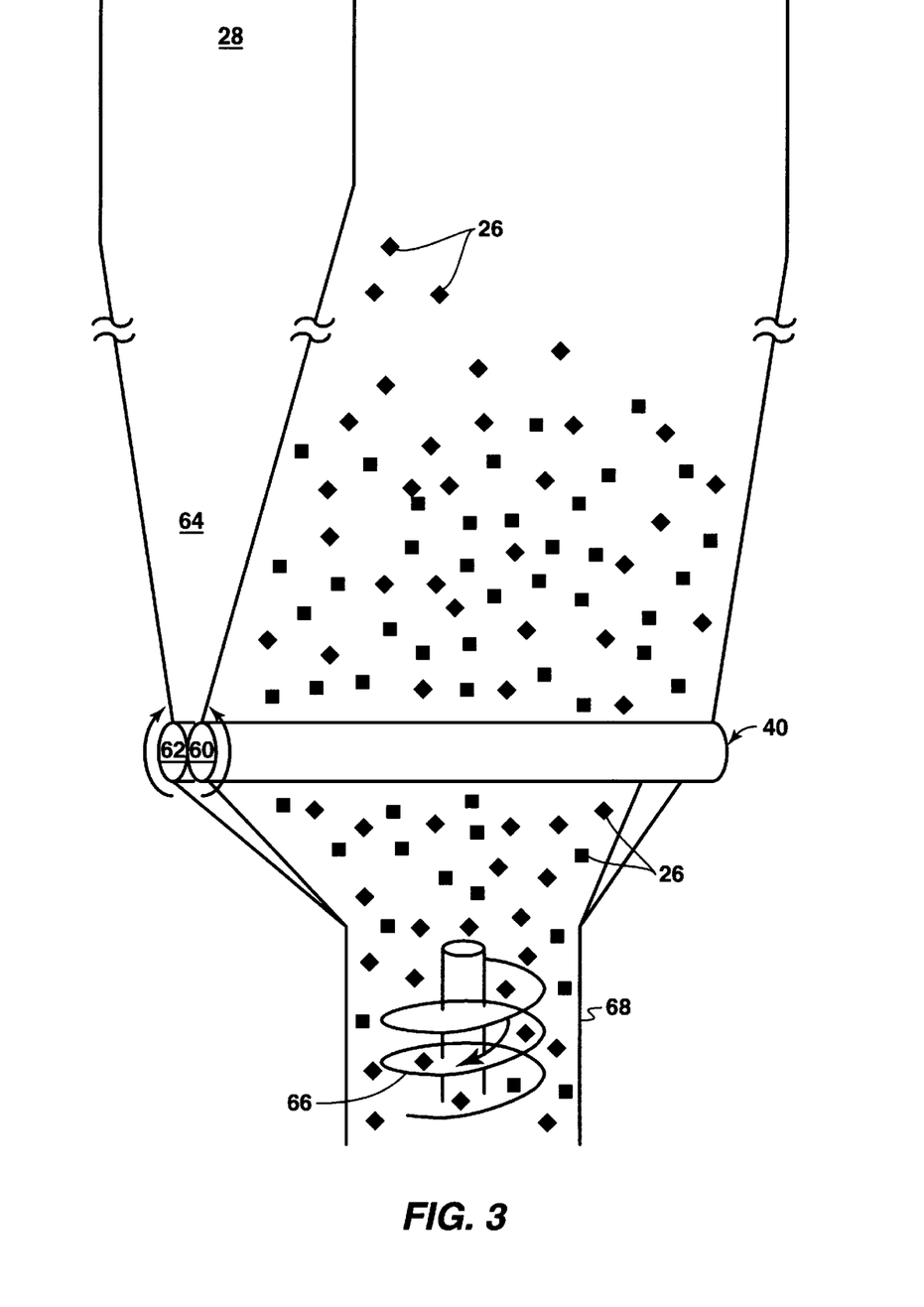
FIG. 3 illustrates one possible device for withdrawing gas hydrate particles in the apparatus and method according to the invention.

One suitable device 40 for removing hydrate particles 26 from the reactor is illustrated in more detail in FIG. 3. After production, the gas hydrate particles 26 eventually fall to the bottom 28 of the reactor vessel. A means for withdrawing gas hydrate particles 40 is provided at the bottom 28 of the reactor vessel 12. In the embodiment illustrated in FIG. 3, the means for withdrawing gas hydrate particles 40 includes a pair of rollers or grinders 60 and 62, positioned such that the gas hydrate particles 26 fall by gravity out of the fluidized or expanded reaction bed toward the rollers or grinders 60 and 62. If necessary, a transition zone 64 can be provided to guide the gas hydrate particles 26 from the bottom 28 of the reactor vessel to the rollers or grinders 60 and 62.

The gas hydrate particles 26 pass through the pair of rollers or grinders 60 and 62 as they exit the reactor vessel.

In this manner, the gas hydrate particles 26 can be crushed to a desired size and shape immediately after production.

The use of a pair of rollers 60 and 62 at the exit of the reactor vessel 12 also is advantageous because the rollers 60 and 62 can help seal the reactor vessel 12 and maintain it at an elevated pressure condition. Typically, when used as such, the rollers 60 and 62 are coated with a flexible material, such as rubber or a suitable polymer composite material.

After exiting the reactor (e.g., through the rollers or grinders 60 and 62), if desired, the hydrate particles can be transported with an appropriate moving device 68. In the illustrated embodiment, the hydrate crystals 26 are moved by a screw conveyor 66. Alternatively, the hydrate crystals 26 can be transferred (e.g., by gravity) into a waiting storage device or movable vehicle. Any other suitable system for moving the gas hydrates can be used without departing from the invention.

If desired, seed crystals of gas hydrate particles or other finely divided solid particles can be introduced into the reactor 12. This can be particularly helpful during reactor start-up, before the reaction is running at steady state. The introduction of seed crystals or finely divided solids can provide nucleation sites for the initial hydrate forming reactions, helping the system reach steady state more quickly. If desired, some of the gas hydrate particles withdrawn from the reactor 12 can be recycled to provide the seed crystals.

One advantageous feature of the apparatus according to the invention is the fact that no packing material, equipment, or other material is necessary within the reactor to produce the fluidized bed. The apparatus interior can be empty when the process starts, without any mechanical obstacles to impede movement of the reactants or products. The solid hydrate product makes up the material for use in the fluidized or expanded reaction bed. This reduces the possibility of reactor fouling and clogging.

Additionally, if desired, an appropriate auxiliary gas (e.g., inert gas) can be injected into the reactor to help maintain the fluidized or expanded bed.

The gas hydrate materials produced according to this invention can be stored, transported, or used in any manner known in the art. For example, the hydrates can be transferred to a storage unit for short or long term storage. One suitable hydrate storage unit is described in U.S. patent application No. 08/950,249, filed Oct. 14, 1997, now U.S. Pat. No. 5,964,093, in the names of inventors Roland B. Saeger, David D. Huang, Jinping Long, and Robert F. Heinemann, entitled "Gas Hydrate Storage Reservoir." This patent application is entirely incorporated herein by reference. As another alternative, the gas hydrates can be transported to an appropriate place for regassification and use of the gas composition included within the hydrates. Although any suitable regassification system can be used with the hydrates produced by the invention, one suitable regassification unit is described in U.S. patent application No. 08/950,247, filed Oct. 14, 1997, now U.S. Pat. No. 6,028,235 in the names of inventors Roland B. Saeger, David D. Huang, Jinping Long, and Robert F. Heinemann, entitled "Gas Hydrate Regassification Method and Apparatus Using Steam or Other Heated Gas or Liquid." This patent application also is entirely incorporated herein by reference. Another suitable regassification system is described in the "Gas Hydrate Storage Reservoir" application identified above.

Thus, in accordance with the invention, a simple, compact, inexpensive, and efficient method and apparatus is provided for producing gas hydrates. The apparatus and method are well suited for use on board a ship, on an oil platform, or in any location where space is at a premium. Also, because of its simplicity, the method and apparatus according to the invention are well suited for use in remote or difficult to reach locations.

As is evident from the foregoing, the apparatus and method according to the invention are well suited for continuous operation (e.g., continuous introduction of hydrate-forming gas and/or water, as well as continuous product removal). Of course, the invention also can be operated in a semi-continuous or batchwise manner without departing from the invention.

In this application, Applicants have described certain theories in an effort to explain how and why this invention works in the manner in which it works. These theories are set forth for informational purposes only. Applicants are not to be bound by any particular chemical, physical, or mechanical theory of operation.

While the invention has been described in terms of various preferred embodiments using specific examples, those skilled in the art will recognize that various changes and modifications can be made without departing from the spirit and scope of the invention, as defined in the appended claims.

We claim:

1. A method for producing gas hydrates, comprising:
   introducing a hydrate-forming gas into a fluidized or expanded reaction bed, wherein the hydrate-forming gas provides at least a portion of a gas flow necessary to produce or maintain the fluidized or expanded reaction bed;
   introducing water into the fluidized or expanded reaction bed, so that said water is in the form of water particles in said fluidized or expanded reaction bed, wherein the hydrate-forming gas and the water react to form gas hydrate particles, wherein at least a portion of the gas hydrate particles so formed provide a solid material for the fluidized or expanded reaction bed; and
   removing at least a portion of the gas hydrate particles from the fluidized or expanded reaction bed.

2. A method according to claim 1, further comprising withdrawing at least a portion of the hydrate-forming gas from the fluidized or expanded reaction bed.

3. A method according to claim 2, further comprising recycling at least a portion of the withdrawn hydrate-forming gas back into the fluidized or expanded reaction bed.

4. A method according to claim 3, further comprising cooling the withdrawn hydrate-forming gas before recycling it into the fluidized or expanded reaction bed.

5. A method according to claim 1, wherein the fluidized or expanded reaction bed is contained within a reactor, the method further comprising defrosting at least a portion of a wall of the reactor.

6. A method according to claim 1, wherein the hydrate-forming gas and the water flow in a countercurrent manner to the fluidized or expanded reaction bed.

7. A method according to claim 1, wherein the hydrate-forming gas and the water are continuously introduced into the fluidized or expanded reaction bed.

8. A method for producing gas hydrates, comprising:
   introducing a hydrate-forming gas into a lower portion of a reactor;
   introducing water into the reactor;
   contacting the hydrate-forming gas and the water together to form gas hydrate particles;

forming a fluidized or expanded reaction bed including at least a portion of the hydrate-forming gas and at least a portion of the gas hydrate particles, wherein water in the fluidized or expanded reaction bed is in the form of particles, and wherein at least a portion of the fluidized or expanded reaction bed is formed in at least part of the lower portion of the reactor; and removing at least a portion of the gas hydrate particles from the reactor.

9. A method according to claim 8, further comprising withdrawing at least a portion of the hydrate-forming gas from the upper portion of the reactor.

10. A method according to claim 9, further comprising recycling at least a portion of the withdrawn hydrate-forming gas into the lower portion of the reactor.

11. A method according to claim 10, further comprising cooling the withdrawn hydrate-forming gas before recycling it into the reactor.

12. A method according to claim 8, further comprising defrosting at least a portion of a wall of the reactor.

13. A method according to claim 8, wherein the hydrate-forming gas and the water flow in a countercurrent manner to the fluidized or expanded reaction bed.

14. A method according to claim 8, wherein the hydrate-forming gas and the water are continuously introduced into the reactor.

* * * * *